United States Patent [19]

Kloss et al.

[11] 4,292,681
[45] Sep. 29, 1981

[54] HOUSING FOR INSTRUMENTS POWERED BY AMBIENT OXYGEN ELEMENTS

[75] Inventors: Wolfgang Kloss, Ellwangen; Hans Sauer, Idstein-Walsdorf, both of Fed. Rep. of Germany

[73] Assignee: Varta Batterie Aktiengesellschaft, Hanover, Fed. Rep. of Germany

[21] Appl. No.: 3,985

[22] Filed: Jan. 16, 1979

[30] Foreign Application Priority Data

Feb. 1, 1978 [DE] Fed. Rep. of Germany ....... 2804205

[51] Int. Cl.³ .................... G04B 37/00; H01M 12/06
[52] U.S. Cl. ........................... 368/280; 429/27

[58] Field of Search .................... 58/55, 88 R, 90 R, 58/90 B, 104; 73/431; 429/27; 368/88, 276, 280, 286, 289, 291, 292

[56] References Cited

U.S. PATENT DOCUMENTS

| | | | |
|---|---|---|---|
| 3,914,813 | 10/1975 | Berchielli et al. | 429/27 |
| 4,103,483 | 8/1978 | Riley | 58/90 R |
| 4,118,544 | 10/1978 | Przybyla et al. | 429/27 |

FOREIGN PATENT DOCUMENTS 2629106 1/1977 Fed. Rep. of Germany ... 58/23 BA

Primary Examiner—Vit W. Miska
Attorney, Agent, or Firm—Weiser, Stapler & Spivak

[57] ABSTRACT

The instrument housing has a gas passage closed-off by a hydrophobic, microporous substance.

6 Claims, 3 Drawing Figures

HOUSING FOR INSTRUMENTS POWERED BY AMBIENT OXYGEN ELEMENTS

The invention relates to a housing with gas passage for electrical instruments powered by air oxygen elements.

Air oxygen elements are finding application in increasing quantities for energizing electrical instruments. Examples of instruments which can be powered particularly with alkaline zinc-air cells are electric watches. Although such cells possess especially high capacity they have heretofore not been used in wrist watches because the required air supply aperture causes the watch casing to be no longer waterproof. This also applies to other electrically energized instruments which have water-tight enclosures.

Accordingly, it is an object of the invention to provide a housing for electrical instruments powered with air oxygen elements, in which water access through the gas passage is precluded.

This and other objects which will appear are accomplished in accordance with the present invention by making the gas passage of a hydrophobic, microporous substance.

In a preferred embodiment the gas passage is formed of an unsintered polytetrafluorethylene sealing body which is positioned between two interconnected portions of the housing. Another suitable material for the gas passage is polyethylene.

Figure 1:
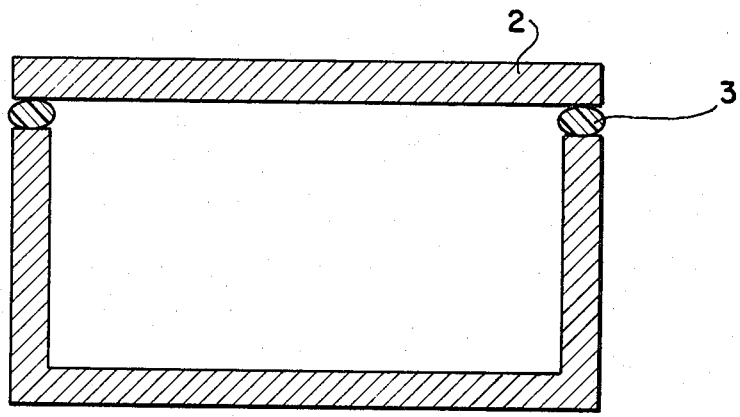
Figure 2:
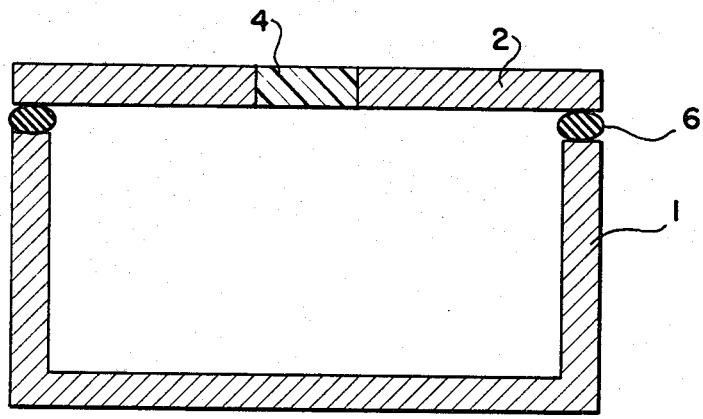
Figure 3:
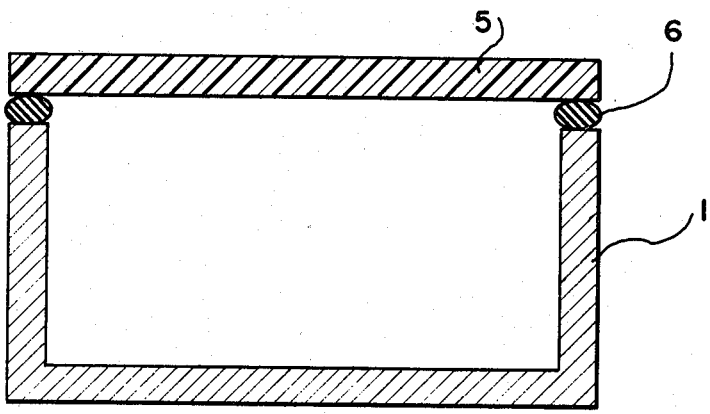

For further details, reference is made to the discussion which follows in light of the accompanying drawings wherein FIG. 1 shows a microporous seal positioned between two portions of the enclosure, FIG. 2 shows a housing with an aperture closed by a microporous component, and FIG. 3 shows a housing which consists in part of a microporous hydrophobic material.

FIG. 1, to which reference may now be had, shows in cross-section a housing consisting of portions 1 and 2, and an air passage positioned between these two portions which consists of a hydrophobic, microporous sealing ring 3. Such a housing is especially suited for electrically powered wrist watches. Electric wrist watches are customarily provided with a non-gas trasmissive sealing ring positioned between the housing parts. By providing the microporous hydrophobic sealing ring 3 as the air passage, it becomes possible to utilize air oxygen cells in a water-tight watch for energizing the watch movement.

FIG. 2, to which reference may now be had, shows a housing consisting of portions 1 and 2 in which the housing portions are connected in watertight manner to each other by means of a non-gas transmissive sealing ring. The portion 2 which takes the form of the housing lid, is provided with a gas passage 4, which is closed by a microporous, hydrophobic component. The air oxygen elements which are housed within the enclosure are supplied with air through this component which may, for example, be made of unsintered polytetrafluorethylene foil. It is also possible to provide several such air transmissive apertures, closed off by microporous sealing bodies.

If a watch which is so equipped is immersed in water, the hydrophobic property of the sealng ring provided as the air passage creates an interruption of the air supply, but without permitting water to penetrate through the micropores. Thus, a commercially available, unsintered, mechanical supported polytetrafluorethylene foil having a thickness of only 0.2 millimeters and material density of 1.6 g/cm$^3$ has resisted water pressures greater than 16 kg/cm$^2$. This corresponds to an immersion depth of 160 meters. However, interruption of the air supply does not cause stoppage of the watch movement because the air which is enclosed within the watch casing assures supply of the cell over a comparatively long period of time. As an example of this, reference is made to a current supply by means of an air-zinc cell. Modern quartz controlled watches require up to a maximum of 5 $\mu$A depending upon the system and configuration. This results in a consumption of about 5 $\mu$-liters of air per hour. Because at least 500–1000 $\mu$l of air are enclosed in the interior of the casing of a wrist watch, the air-zinc cell can supply its oxygen requirements itself, from the interior of the casing, for up to 100 hours in the worst case. It contrast, a diver remains under water for only a few hours. Thus, an unimpeded operation of an electric wrist watch with an air-zinc cell becomes possible.

Furthermore, as appears from FIG. 3 to which reference may now be had, it is possible to construct a casing which consists of a non-gas transmissive portion 1 which is covered with a gas transmissive, microporous hydrophobic casing portion 5. Between the microporous casing portion 5 and casing portion 1 a gas and watertight seal 6 is positioned. The elements located in the interior of the casing are supplied with ambient oxygen via casing portion 5.

The high energy density of the ambient oxygen cells is advantageous since for the same capacity it makes possible a lower structural height of the casing than if previously used cells are utilized. In addition, zinc-air cells are more cost effective than other cells of comparable capacity.

We claim:

1. A housing for completely enclosing an electrical instrument and the ambient oxygen cell by which it is powered, said housing comprising two separate but interconnected gas-impermeable portions and a sealing body positioned at the interconnection between said housing portions, the sealing body being formed of a hydrophobic microporous substance and constituting a gas passage for the housing, the housing being gas tight except at the sealing body.

2. The housing of claim 1 wherein the sealing body consists of unsintered polytetrafluorethylene.

3. The housing of claim 1 wherein the sealing body consists of polyethylene.

4. The housing of claim 1 wherein the sealing body has a thickness of about 0.2 mm. and a density of about 1.6 g/cm$^3$.

5. The housing of claim 1 which consists of a cup portion and a lid portion and wherein the sealing body is a sealing ring positioned between the cup and the lid.

6. The housing of claim 1 which encloses an electrical watch movement.

* * * * *